(12) United States Patent
He (10) Patent No.: US 12,439,012 B2
(45) Date of Patent: Oct. 7, 2025

(54) IMAGE PROCESSING METHOD AND APPARATUS, ELECTRONIC DEVICE AND READABLE STORAGE MEDIUM

(71) Applicant: Beijing Zitiao Network Technology Co., Ltd., Beijing (CN)

(72) Inventor: Siyu He, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/759,733

(22) Filed: Jun. 28, 2024

(65) Prior Publication Data
US 2024/0357200 A1 Oct. 24, 2024

Related U.S. Application Data

(63) Continuation of application No. PCT/CN2022/142142, filed on Dec. 27, 2022.

(30) Foreign Application Priority Data

Dec. 30, 2021 (CN) .......................... 202111658426.2

(51) Int. Cl.
*H04N 9/67* (2023.01)
*G11B 27/031* (2006.01)
*H04N 21/4402* (2011.01)

(52) U.S. Cl.
CPC ............. *H04N 9/67* (2013.01); *G11B 27/031* (2013.01); *H04N 21/440254* (2013.01)

(58) Field of Classification Search
None
See application file for complete search history.

(56) References Cited

U.S. PATENT DOCUMENTS 12,118,963 B2 * 10/2024 Mitsutake .............. G09G 5/377
2017/0006273 A1 * 1/2017 Borer ....................... H04N 9/68
(Continued)

FOREIGN PATENT DOCUMENTS

| CN | 110730339 A | 1/2020 |
|---|---|---|
| CN | 112449169 A | 3/2021 |

(Continued)

OTHER PUBLICATIONS

International Search Report and Written Opinion for PCT/CN2022/142142, mailed Mar. 8, 2023, 11 pages.

(Continued)

*Primary Examiner* — Gelek W Topgyal
(74) *Attorney, Agent, or Firm* — Astute IP Law Group (57) ABSTRACT

The present disclosure relates to an image processing method and apparatus, an electronic device and a readable storage medium. The method comprises: traversing a plurality of multimedia materials, and according to a target color display standard, determining a multimedia material of a non-target color display standard included in the plurality of multimedia materials; converting the multimedia material of the non-target color display standard into a multimedia material of the target color display standard; and performing image rendering on the plurality of multimedia materials according to the target color display standard, so as to display the plurality of multimedia materials according to the image rendering result or export the plurality of multimedia materials as a video file in a specific format according to the image rendering result.

20 Claims, 3 Drawing Sheets

(56) References Cited

U.S. PATENT DOCUMENTS

| | | | |
|---|---|---|---|
| 2017/0064334 A1* | 3/2017 | Minoo | H04N 19/105 |
| 2017/0186141 A1 | 6/2017 | Ha et al. | |
| 2017/0244983 A1* | 8/2017 | Atkins | H04N 19/30 |
| 2019/0172416 A1 | 6/2019 | Yokota et al. | |
| 2019/0281253 A1 | 9/2019 | Tsukagoshi | |
| 2020/0404153 A1 | 12/2020 | Nishiguchi | |
| 2020/0410748 A1 | 12/2020 | Glen et al. | |
| 2021/0067736 A1* | 3/2021 | Cheng | G09G 5/006 |
| 2021/0125316 A1* | 4/2021 | Chakrabarty | G06T 11/206 |
| 2021/0337163 A1 | 10/2021 | Diggins et al. | |
| 2022/0199054 A1* | 6/2022 | Suzuki | G09G 5/10 |

FOREIGN PATENT DOCUMENTS

| | | | |
|---|---|---|---|
| CN | 113518185 A | 10/2021 | |
| CN | 113691865 A | 11/2021 | |
| EP | 3448043 A1 | 2/2019 | |
| JP | 2015-179223 A | 10/2015 | |
| JP | 2019-103041 A | 6/2019 | |
| JP | 2021-002746 A | 1/2021 | |
| WO | 2016120424 A1 | 8/2016 | |
| WO | 2018/070255 A1 | 4/2018 | |
| WO | 2021/079640 A1 | 4/2021 | |

OTHER PUBLICATIONS

Extended European Search Report for European Patent Application No. 22914721.0, mailed on Jan. 22, 2025, 11 pages.

Office Action received for Japanese Patent Application No. 2024-539255, mailed on Apr. 22, 2025, 16 pages (8 pages of English Translation and 8 pages of Original Document).

* cited by examiner

IMAGE PROCESSING METHOD AND APPARATUS, ELECTRONIC DEVICE AND READABLE STORAGE MEDIUM

CROSS-REFERENCING OF RELEVANT APPLICATIONS

The present application is based on the PCT application No. PCT/CN2022/142142 filed on Dec. 27, 2022 and the Chinese application No. 202111658426.2 filed on Dec. 30, 2021, and asserts their priority. The disclosure of each of these applications is incorporated herein into the present application as a whole.

TECHNICAL FIELD

The present disclosure relates to the technical field of image processing, and in particular, to an image processing method and apparatus, an electronic device, and a readable storage medium.

BACKGROUND

When editing videos, a plurality of multimedia materials are often edited to generate videos that meet the expected display effect.

SUMMARY

The present disclosure provides an image processing method and apparatus, an electronic device and a readable storage medium.

In a first aspect, the present disclosure provides an image processing method, including:
  determining, according to a target color display standard, a multimedia material of a non-target color display standard that is included in a plurality of multimedia materials;
  transferring the multimedia material of the non-target color display standard into a multimedia material of the target color display standard; and
  performing image rendering on the plurality of multimedia materials according to the target color display standard, so as to display the plurality of multimedia materials on a display screen of an electronic device according to an image rendering result or export the plurality of multimedia materials into a video file in a specific format according to the image rendering result.

In some embodiments, before determining, according to a target color display standard, a multimedia material of a non-target color display standard that is included in the plurality of multimedia materials, the method also includes:
  determining the target color display standard.

In some embodiments, the determining the target color display standard includes:
  determining the target color display standard according to color display standards respectively corresponding to the plurality of multimedia materials.

In some embodiments, the determining the target color display standard according to color display standards respectively corresponding to the plurality of multimedia materials includes:
  determining the target color display standard according to a color display standard with the widest color space among the color display standards respectively corresponding to the plurality of multimedia materials.

In some embodiments, the determining the target color display standard includes: determining the target color display standard according to a pre-specified color display standard.

In some embodiments, transferring the multimedia material of the non-target color display standard into the multimedia material of the target color display standard includes:
  in response to the multimedia material of the non-target color display standard is generated according to a video frame image of another multimedia material of the non-target color display standard among the plurality of multimedia materials at a freeze frame position, transferring the multimedia material of the non-target color display standard into the multimedia material of the target color display standard; alternatively,
  in response to the multimedia material of the non-target color display standard is generated according to a video frame image of a multimedia material of the target color display standard among the plurality of multimedia materials at the freeze frame position, not transferring the multimedia material of the non-target color display standard.

In some embodiments, the target color display standard is a perceptually quantized (PQ) color display standard, and the non-target color display standard includes a standard dynamic range (SDR) color display standard and/or a hybrid log gamma curve (HLG) color display standard; alternatively,
  the target color display standard is the SDR color display standard, and the non-target color display standard includes the HLG color display standard and/or the PQ color display standard; alternatively,
  the target color display standard is the HLG color display standard, and the non-target color display standard includes the SDR color display standard and/or the PQ color display standard.

In some embodiments, before performing image rendering on the plurality of multimedia materials according to the target color display standard, the method also includes:
  processing the plurality of multimedia materials according to editing operation modes respectively corresponding to one or more editing types.

In a second aspect, the present disclosure provides an image processing apparatus, including:
  an identification module, which is configured to determine, according to a target color display standard, a multimedia material of a non-target color display standard that is included in a plurality of multimedia materials;
  a transfer module, which is configured to transfer the multimedia material of the non-target color display standard into a multimedia material of the target color display standard;
  a rendering module, which is configured to perform image rendering on the plurality of multimedia materials; and
  a control module, which is configured to control a display of the plurality of multimedia materials on a display screen of an electronic device according to an image rendering result, or to control an export of the plurality of multimedia materials into a video file in a specific format according to the image rendering result.

In a third aspect, the present disclosure provides an electronic device, including: a memory and a processor;
  the memory being configured to store computer program instructions;

the processor being configured to execute the computer program instructions, so that the electronic device implements the image processing method as described in the first aspect.

In a fourth aspect, the present disclosure provides a readable storage medium, including computer program instructions;

at least one processor of an electronic device executing the computer program instructions to implement the image processing method as described in the first aspect.

In a fifth aspect, the present disclosure provides a computer program product, which, when executed by a computer, allows the computer to implement the image processing method as described in the first aspect.

In a sixth aspect, the present disclosure provides a computer program, including instructions which, when executed by a processor, allow the processor to implement the image processing method as described in the first aspect.

The present disclosure provides an image processing method and apparatus, an electronic device and a readable storage medium. The method includes: traversing a plurality of multimedia materials, and determining, according to a target color display standard, a multimedia material of a non-target color display standard that is included in the plurality of multimedia materials; transferring the multimedia material of the non-target color display standard into a multimedia material of the target color display standard; and performing image rendering on the plurality of multimedia materials according to the target color display standard, so as to display the multimedia materials or export the multimedia materials into a video file in a specific format according to an image rendering result.

BRIEF DESCRIPTION OF THE DRAWINGS

The accompanying drawings, which are incorporated in and constitute a part of this specification, illustrate embodiments consistent with the present disclosure and together with the description, serve to explain the principles of the present disclosure.

In order to more clearly illustrate the embodiments of the present disclosure or the technical solutions in the prior art, the accompanying drawings needed to be used in the description of the embodiments or the prior art will be briefly introduced below. It will be apparent to those of ordinary skill in the art that other accompanying drawings may be obtained from these accompanying drawings without creative efforts.

DETAILED DESCRIPTION

In order to understand the above objects, features and advantages of the present disclosure more clearly, the solution of the present disclosure will be further described below. It should be noted that, as long as there is no conflict, the embodiments of the present disclosure and the features in the embodiments can be combined with each other.

Many specific details are set forth in the following description to fully understand the present disclosure, but the present disclosure can also be implemented in other ways different from those described here. Obviously, the embodiments in the description are only part of the embodiments of the present disclosure, but not all of them.

If the color display standards of a plurality of multimedia materials are the same, videos obtained by editing can meet the expected display effect. However, since the color space, brightness range and other parameters of different color display standards are different, if the color display standards of the plurality of multimedia materials are not exactly the same, a synthesized video obtained after editing and previewed during the editing process cannot be displayed as expected if displayed according to an original color display standard of each multimedia material. For example, the first multimedia material is a multimedia material of a standard dynamic range (SDR) color display standard, and the second multimedia material is a multimedia material of a high dynamic range (HDR) color display standard. Since the color space of the SDR color display standard is bt. 709 and the brightness range is 0-100 nit, while the color space of the HDR color display standard is bt. 2020 and the brightness range is 0-10000 nit, if the first multimedia material is displayed according to the SDR color display standard and the second multimedia material is displayed according to the HDR color display standard after editing, the visual difference between the two multimedia materials before and after is large, which cannot achieve the expected display effect and greatly reduces the user experience.

Based on this, the present disclosure provides an image processing method and apparatus, an electronic device, a readable storage medium and a computer program product. In the method, a multimedia material of a non-target color display standard among a plurality of multimedia materials into a multimedia material of a target color display standard, making color display standards of the plurality of multimedia materials consistent. In a synthesized video obtained based on this, the individual multimedia materials are displayed according to the target color display standard to remain the visual effect consistent, so that the display effect as expected of the multimedia materials can be achieved.

Exemplarily, the image processing method provided in the present disclosure can be executed by the image processing apparatus provided in the present disclosure, and the image processing apparatus can be implemented by means of any software and/or hardware. Exemplarily, the image processing apparatus may include but is not limited to: tablet computers, mobile phones (such as folding screen mobile phones, large screen mobile phones, etc.), notebook computers, ultra-mobile personal computers (UMPC), netbooks, personal digital assistants (PDA), smart TVs, smart screens, high-definition TVs, 4K TVs, smart projectors and other the internet of things (IOT) devices, servers, server clusters, cloud servers, etc. The present disclosure does not place any limitations on specific types of electronic devices.

The embodiments of the present disclosure will take an electronic device as an example, and a video editing application (referred to as Application 1) is installed in the electronic device. The image processing method provided in the present disclosure can be explained in detail by taking the edition of a plurality of multimedia materials through Application 1 as an example, in conjunction with the accompanying drawings and application scenarios.

The image processing method provided in the present disclosure can be applied to the following scenarios:

Scenario 1: when starting the Application 1 and importing multimedia materials for the first time.

Scenario 2: when adding new multimedia materials during the process of editing a plurality of multimedia materials.

Scenario 3: when inserting specified multimedia materials at a freeze frame position by using a freeze frame function provided by Application 1. The "freeze frame function" refers to saving a video frame image at a specified position as an image, and then inserting corresponding number of the image at the specified position according to a playback rate.

Certainly, the method provided in the present disclosure is not limited to be applied to the above scenarios, and the above scenarios 1 to 3 are only examples.

Figure 1:
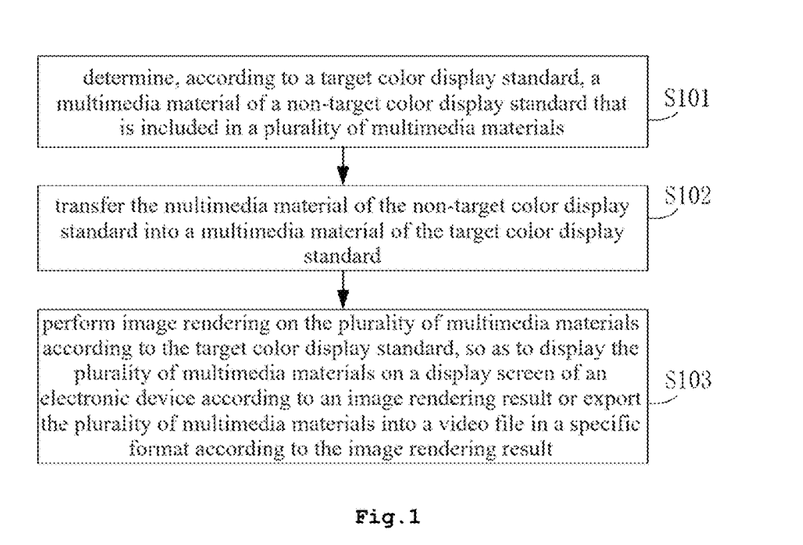
FIG. 1 is a schematic flowchart of an image processing method provided in an embodiment of the present disclosure.

FIG. 1 is a schematic flowchart of an image processing method provided in an embodiment of the present disclosure. Referring to FIG. 1, the method provided in this embodiment includes:

S101, determine, according to a target color display standard, a multimedia material of a non-target color display standard that is included in a plurality of multimedia materials.

The present disclosure does not limit the type of multimedia materials. For example, the multimedia materials can be any type of materials such as photos, pictures, videos, etc. In addition, the present disclosure does not limit the number of multimedia materials.

In addition, the color display standards corresponding to a plurality of multimedia materials may not be exactly the same, or may be the same, which is not limited in the present disclosure. For example, there are five multimedia materials, three of which are multimedia materials of the PQ color display standard, one of which is a multimedia material of the HLG color display standard, and the other one is a multimedia material of the SDR color display standard.

The present disclosure does not limit the target color display standard and the non-target color display standard. Exemplarily, the target color display standard is the PQ color display standard, and the non-target color display standard includes the SDR color display standard and/or the HLG color display standard; alternatively, the target color display standard is the SDR color display standard, and the non-target color display standard includes the HLG color display standard and/or the PQ color display standard; alternatively, the target color display standard is the HLG color display standard, and the non-target color display standard includes the SDR color display standard and/or the PQ color display standard.

It should be noted that the target color display standard and the non-target color display standard are not limited to the above situations. For example, the target color display standard can also be a color display standard with a wider color space and a higher brightness range.

The present disclosure does not limit the implementation method of the electronic device acquiring a plurality of multimedia materials. Exemplarily, the electronic device can start Application 1 and acquire a plurality of multimedia materials from a local storage space of the electronic device through a relevant entrance provided by Application 1. In addition, when acquiring the multimedia materials, the electronic device acquires relevant attribute information of each multimedia material at the same time, and determines the target color display standard corresponding to the multimedia materials based on the relevant attribute information of the multimedia materials.

For example, the relevant attribute information of the multimedia materials may include color space information, color transfer information (color transfer information), etc., and the electronic device may determine color display standards corresponding to the multimedia materials based on the color transfer information corresponding to the multimedia materials.

Exemplarily, assuming that the format of the color transfer information corresponding to the multimedia materials is as follows:

"color_transfer": "smpte2840"; alternatively,
"color_transfer": "arib-std-b67".

According to "smpte2840" or "arib-std-b67", it can be determined that the color display standard corresponding to this multimedia material is HDR.

Based on this, Application 1 can determine a multimedia material of the non-target color display standard that is included in a plurality of multimedia materials by traversing relevant information of the plurality of multimedia materials, determining color display standards corresponding to each multimedia material in the plurality of multimedia materials, and comparing the color display standards corresponding to each multimedia material with the target color display standard. There may be one or more multimedia materials of the non-target color display standard.

For example, there are five multimedia materials, three of which are multimedia materials of the PQ color display standard, one of which is a multimedia material of the HLG color display standard, and the other one is a multimedia material of the SDR color display standard. Assuming that the target color display standard is the PQ color display standard, the multimedia materials of the non-target color display standards include multimedia materials of the HLG color display standard and multimedia materials of the SDR color display standard.

In some cases, when inserting a corresponding image at a specified position by means of the freeze frame function provided by Application 1, if the color display standard of the original multimedia material to obtain the image is different from the color display standard of the saved image, the inserted image will produce color difference. For example, the original multimedia material corresponding to the specified position is of the HDR color display standard, but the electronic device only supports saving the image at the specified position as a jpeg format image, and the jpeg format image is an image of the SDR color display standard, which will result in a color difference between the inserted image and the original multimedia material.

Therefore, when saving an image extracted from the original multimedia material by means of the freeze frame function, a transfer file can be generated for the image. The transfer file can store relevant attribute information of the image, such as the information of a color display standard corresponding to an image source (i.e., the original multimedia material). When inserting the image, if it is determined based on the transfer file that the image comes from a multimedia material of the target color display standard, the image may not be transferred although the image is saved in the non-target color display standard; and if it is determined based on the transfer file that the image comes from a multimedia material of the non-target color display standard, it is determined that the image is a multimedia material of the non-target color display standard that needs to be transferred.

That is to say, if one multimedia material among the plurality of multimedia materials is generated based on another multimedia material among the plurality of multimedia materials, the color display standard of the source multimedia material is used to determine whether the multimedia materials need to be transferred.

S102, transfer the multimedia material of the non-target color display standard into a multimedia material of the target color display standard.

In some embodiments, implementing step S102 may include the following steps:

Step a, decode the multimedia material of the non-target color display standard to obtain color values of individual pixel points of the multimedia material under the non-target color display standard, that is, to obtain a first set of color values.

Step b, transfer, based on an electro-optical transfer function (EOTF) corresponding to the non-target color display standard, the individual color values in the first set of color values into optical signals under the non-target color display standard, so as to obtain a first set of optical signals;

The electro-optical transfer function is a function used to describe the relationship between a nonlinear color value (a digitally encoded pixel value, an electrical signal) input to the display and a linear color value (an optical signal) displayed by the display.

Since the device stores and transmits electrical signals (ie, color values) and different color display standards correspond to different electro-optical transfer functions, when transferring the color values of the individual pixel points of the multimedia materials under the non-target color display standard into color values under the target color display standard, it is first necessary to transfer the color values of the individual pixel points of the multimedia materials under the non-target color display standard into optical signals, so as to achieve transfer of color values in different color spaces in a linear space.

Step c, transfer, based on an optical-optical transfer function (OOTF), the individual optical signals in the first set of optical signals to obtain a second set of optical signals under the target color display standard.

There is a specific transfer function (can also be understood as a transfer matrix), that is, an optical-optical transfer function between optical signals under different color display standards. By means of the optical-optical transfer function, optical signals under the non-target color display standard can be transferred into optical signals under the target color display standard.

Step d, transfer, based on an optical-electric transfer function (OETF) corresponding to the target color display standard, the individual optical signals in the second set of optical signals into color values, so as to obtain a second set of color values of the multimedia material under the target color display standard.

By transferring optical signals under the target color display standard into electrical signals (color values) under the target color display standard, the color values of the individual pixel points of the multimedia materials under the target color display standard are obtained.

During the above transfer process, the multimedia materials can be transferred in frame units.

Figure 2A:
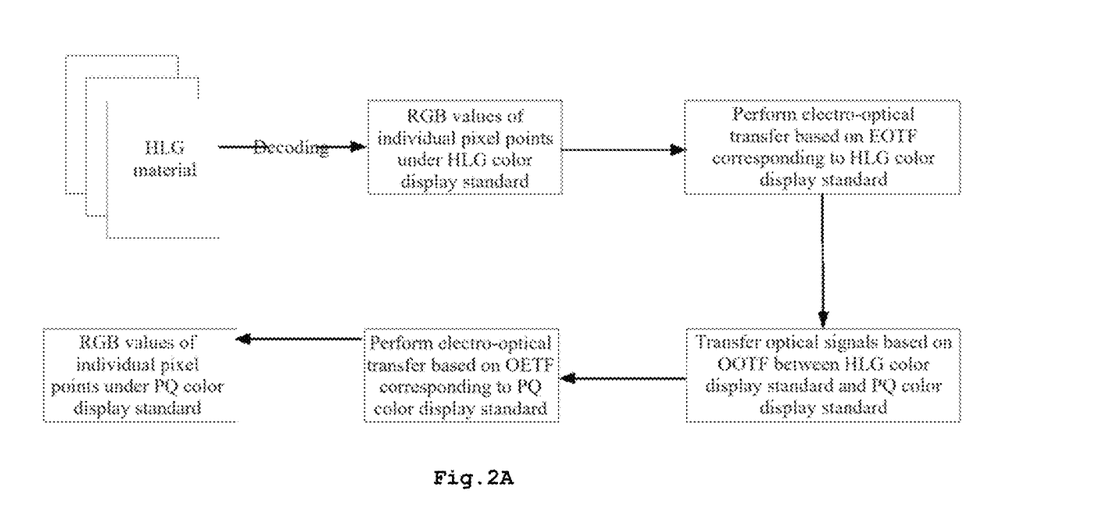
FIG. 2A-FIG. 2B are schematic flowcharts of an image processing method provided in another embodiment of the present disclosure.

Exemplarily, taking the target color display standard as the PQ color display standard and the non-target color display standard as the HLG color display standard as an example, an example is provided in conjunction with FIG. 2A.

The multimedia materials of the HLG color display standard are referred to as HLG materials, and the multimedia materials of the PQ color display standard are referred to as PQ materials.

First, the HLG materials will be decoded to acquire RGB values of individual pixel points of the HLG materials under the HLG color display standard; the individual RGB values under the HLG color display standard are transferred into optical signals under the HLG color display standard according to EOTF of the HLG color display standard; the individual optical signals under the HLG color display standard are transferred into optical signals under the PQ color display standard based on an optical-optical transfer function between the HLG color display standard and the PQ color display standard; and then the individual optical signals under the PQ color display standard are transferred into RGB values under the PQ color display standard according to an optical-electric transfer function of the PQ color display standard, thereby realizing the transfer of the HLG materials into the SDR materials.

It should be noted that when the target color display standard and the non-target color display standard are other situations, the implementation methods are similar, and the difference lies in that the used electro-optical transfer function, optical-optical transfer function and optical-electric transfer function are different. No examples are given here.

In some possible implementations, after the individual optical signals of the non-target color display standard are transferred into optical signals of the target color display standard in the above step c, gamut mapping can also be performed to align the color values under different color display standards. The present disclosure does not limit the specific implementation of gamut mapping.

For example, when the target color display standard is the SDR color display standard and the non-target color display standard is the PQ color display standard, the same RGB value represents different colors in the PQ color display standard and the SDR color display standard. Therefore, the individual optical signals can be subjected to gamut mapping after the optical signals of the PQ color display standard are transferred into the optical signals of the SDR color display standard, so as to align the color values in different color display standards.

Figure 2B:
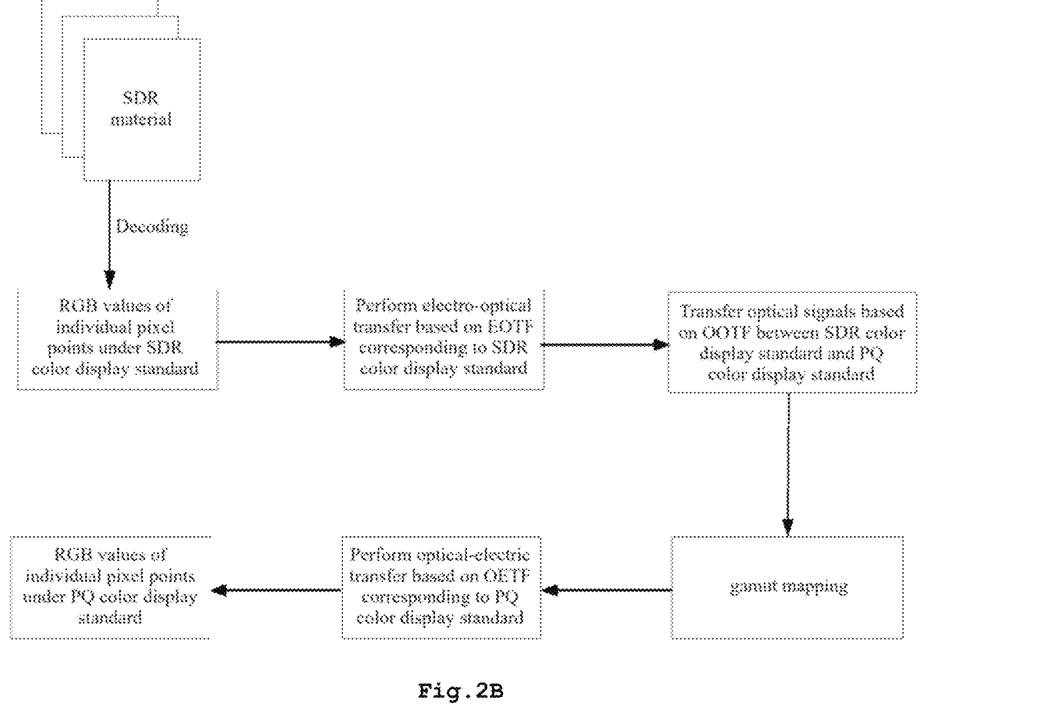

Exemplarily, referring to the embodiment shown in FIG. 2B, when transferring multimedia materials of the SDR color display standard into multimedia materials of the PQ color display standard, the individual optical signals can be subjected to gamut mapping after the individual optical signals under the SDR color display standard are transferred into the optical signals under the PQ color display standard by means of the optical-optical transfer function, and then the optical signals under the PQ color display standard that are subjected to gamut mapping are transferred into electrical signals under the PQ color display standard.

Similarly, when transferring multimedia materials of the PQ color display standard into multimedia materials of the SDR color display standard, and transferring multimedia materials of the HLG color display standard into multimedia materials of the SDR color display standard, gamut mapping can also be performed. Its implementation method is similar to the implementation method shown in FIG. 2B, which, for the sake of simplicity, will not be described again here.

In actual applications, Application 1 can implement step S102 by calling an application programming interface (API) provided by a functional module that implements transfer between different color display standards.

For example, a functional module that implements the transfer of multimedia materials of the HLG color display standard into multimedia materials of the PQ color display standard provides an API which is named "TECoreHLG2PQCore". Application 1 can transfer multimedia materials of the HLG color display standard into multimedia materials of the PQ color display standard by calling the API named "TECoreHLG2PQCore" and by implementing the API.

A functional module used to implement the transfer of multimedia materials of the SDR color display standard into multimedia materials of the PQ color display standard provides an API which is named "TECoreSDR2PQCore". Application 1 can transfer multimedia materials of the SDR color display standard into multimedia materials of the PQ color display standard by calling the API named "TECoreSDR2PQCore" and by implementing the API.

When the target color display standard and the non-target color display standard are other situations, the transfer method implemented by means of API is similar to this example, which, for the sake of simplicity, will not be described again here.

S103, perform image rendering on the plurality of multimedia materials according to the target color display standard, so as to display the plurality of multimedia materials on a display screen of an electronic device according to an image rendering result or export the plurality of multimedia materials into a video file in a specific format according to the image rendering result.

Image rendering of the multimedia materials can be implemented using currently existing rendering technologies. The present disclosure does not limit the specific implementation of image rendering.

In a scenario where multimedia materials are displayed on a display screen of an electronic device, the electronic device can transfer RGB color values of pixel points of the individual multimedia image materials into optical signals according to the electro-optical transfer function corresponding to the target color display standard and the image rendering result, for display. In addition, some or all of the plurality of multimedia materials can be displayed based on different scenarios.

For example, when a user is positioned at a specific video frame location during editing of a plurality of multimedia materials by means of Application 1, the multimedia materials corresponding to the specific location can be displayed according to the target color display standard.

For another example, when the user triggers the playback of a plurality of multimedia materials during editing of the plurality of multimedia materials by means of Application 1, the plurality of multimedia materials are played in sequence according to the target color display standard.

When exporting the plurality of multimedia materials that are subjected to color display standard transfer into a video file in a specific format, the multimedia materials can be encoded based on the image rendering result and according to the information of the RGB color values corresponding to the multimedia materials of the target color display standard, and be saved as a video file in a specific format, for example, mp4 format.

According to the method provided in this embodiment, by traversing a plurality of multimedia materials, determining, according to a target color display standard, a multimedia material of a non-target color display standard that is included in the plurality of multimedia materials; transferring the multimedia material of the non-target color display standard into a multimedia material of the target color display standard; and performing image rendering on the plurality of multimedia materials according to the target color display standard, so as to display the plurality of multimedia materials on a display screen of an electronic device according to an image rendering result or export the plurality of multimedia materials into a video file in a specific format according to the image rendering result, thereby the display effect as expected of the multimedia materials can be achieved.

Based on the embodiment shown in FIG. 1, before performing image rendering on the plurality of multimedia materials according to the target color display standard, the multimedia materials can also be edited. For example, the multimedia materials can be edited according to editing operation methods respectively corresponding to one or more editing types provided by an application.

The editing types include, for example: filters, special effects, stickers, etc. The editing operation methods are specific editing methods provided by the above editing types. For example, the filters may include: landscape filters, food filters, etc.

Figure 3:
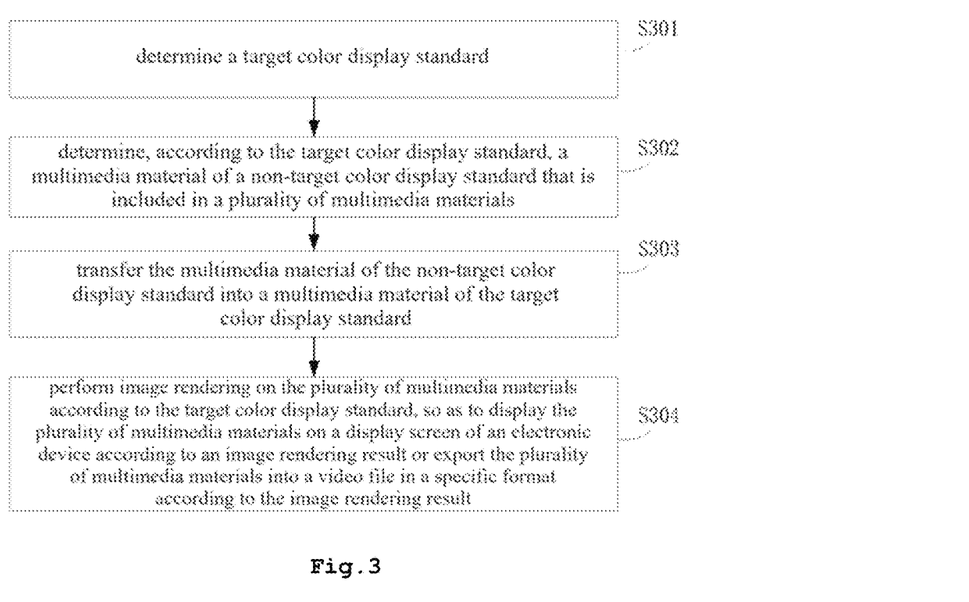
FIG. 3 is a schematic flowchart of an image processing method provided in another embodiment of the present disclosure.

FIG. 3 is a schematic flowchart of an image processing method provided in an embodiment of the present disclosure. Referring to FIG. 3, the method provided in this embodiment includes:

S301, determine a target color display standard.

In some embodiments, the target color display standard can be determined based on an adaptive strategy, that is, the adaptive strategy is a strategy that represents the change of the target color display standard with the target color display standards respectively corresponding to a plurality of multimedia materials. Exemplarily, the target color display standard may be the color display standard with the widest color space among the color display standards respectively corresponding to the plurality of multimedia materials.

For example, when three multimedia materials are imported by means of Application 1, the color display standards respectively corresponding to the three multimedia materials are the same, and it is assumed that the three multimedia materials are all multimedia materials of the SDR color display standards; during the process of video editing, a multimedia material is newly imported, and the newly imported multimedia material is a multimedia material of the PQ color display standard. Thus, based on the adaptive strategy, it can be determined that the target color display standard is the PQ color display standard, that is, the three previously imported multimedia materials need to be transferred into the PQ color display standard.

In another possible implementation, the target color display standard may be a pre-specified color display standard. For example, the target color display standard may be the color display standard specified by Application 1.

When determining the target color display standard, it also needs to consider the color display standard supported by the electronic device, so as to prevent errors. Therefore, before determining the target color display standard by means of the above adaptive strategy or the method specified by an application, it is also possible to test the color display standard of the electronic device to support up-screen display.

Exemplarily, by checking relevant parameters in a specific API, it can be determined that the electronic device supports the target color display standard for up-screen display. For example, when determining whether an electronic device using the Android system supports the HDR color display standard for up-screen display, display parameters supported by the screen of the electronic device and a graphics API can be verified. When both verifications pass, it is determined that the electronic device supports the HDR color display standard for up-screen display. This is only an example, and the specific implementation method is not limited to verifying the display parameters supported by the screen of the electronic device and verifying the graphics API.

S302, determine, according to the target color display standard, a multimedia material of a non-target color display standard that is included in a plurality of multimedia materials.

S303, transfer the multimedia material of the non-target color display standard into a multimedia material of the target color display standard.

S304, perform image rendering on the plurality of multimedia materials according to the target color display standard, so as to display the plurality of multimedia materials on a display screen of an electronic device according to an image rendering result or export the plurality of multimedia materials into a video file in a specific format according to the image rendering result.

Steps S302 to S304 in this embodiment are each similar to S101 to S103 in the embodiment shown in FIG. 1. Reference may be made to the detailed description of the embodiment shown in FIG. 1, which, for the sake of simplicity, will not be described again here.

According to the method provided in this embodiment, by traversing a plurality of multimedia materials, determining, according to a target color display standard, a multimedia material of a non-target color display standard that is included in the plurality of multimedia materials; transferring the multimedia material of the non-target color display standard into a multimedia material of the target color display standard; and performing image rendering on the plurality of multimedia materials according to the target color display standard, so as to display the multimedia materials up-screen or export the multimedia materials into a video file in a specific format based on an image rendering result. Thus, the problem of abnormal display effects of synthesized videos edited from multimedia materials of different color display standards is solved. In addition, during the process of application, the flexibility of image processing can be improved by determining a target color display standard by means of an adaptive strategy or a specified method.

Exemplarily, the present disclosure also provides an image processing apparatus.

Figure 4:
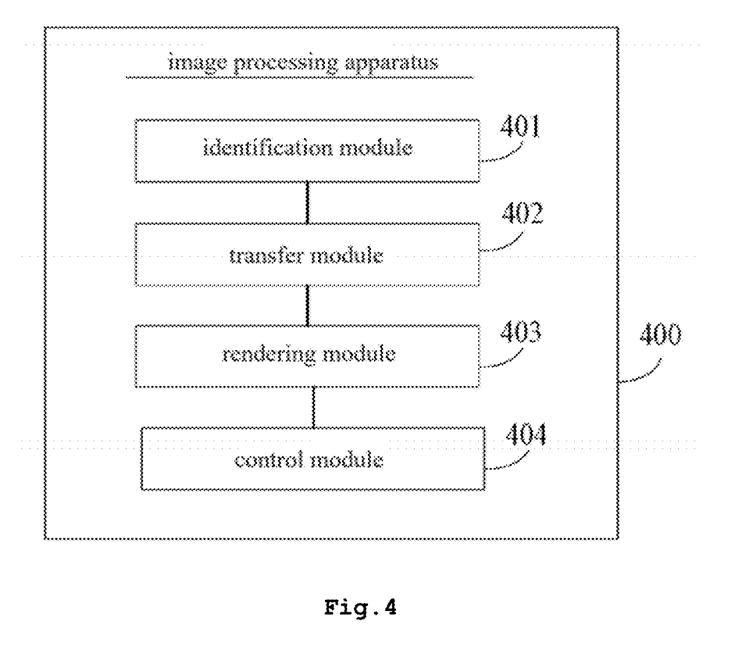
FIG. 4 is a schematic structural diagram of an image processing apparatus provided in an embodiment of the present disclosure.

FIG. 4 is a schematic structural diagram of an image processing apparatus provided in an embodiment of the present disclosure. Referring to FIG. 4, the image processing apparatus 400 provided in this embodiment includes:

An identification module 401, which is configured to determine, according to a target color display standard, a multimedia material of a non-target color display standard that is included in a plurality of multimedia materials.

A transfer module 402, which is configured to transfer the multimedia material of the non-target color display standard into a multimedia material of the target color display standard.

A rendering module 403, which is configured to perform image rendering on the plurality of multimedia materials according to the target color display standard, so as to obtain an image rendering result.

The image processing apparatus 400 may also includes: a control module 404, which is configured to control the display of the plurality of multimedia materials on a display screen of an electronic device according to the image rendering result, or to control the export of the plurality of multimedia materials into a video file in a specific format according to the image rendering result.

In some embodiments, the identification module 401 is also configured to determine a target color display standard before determining, according to a target color display standard, a multimedia material of a non-target color display standard that is included in the plurality of multimedia materials.

In some embodiments, the identification module 401 is specifically configured to determine the target color display standard according to color display standards respectively corresponding to the plurality of multimedia materials.

In some embodiments, the identification module 401 is specifically configured to determine the target color display standard according to the color display standard with the widest color space among the color display standards respectively corresponding to the plurality of multimedia materials.

In some embodiments, the identification module 401 is specifically configured to determine the target color display standard according to a pre-specified color display standard.

In some embodiments, the transfer module 402 is specifically configured to transfer the multimedia material of the non-target color display standard into a multimedia material of the target color display standard if the multimedia material of the non-target color display standard is generated according to a video frame image of another multimedia material of the non-target color display standard among the plurality of multimedia materials at a fixed position; alternatively, not transfer the multimedia material of the non-target color display standard if the multimedia material of the non-target color display standard is generated according to a video frame image of the multimedia material of the target color display standard among the plurality of multimedia materials at the fixed position.

In some embodiments, the target color display standard is a PQ color display standard, and the non-target color display standard includes a SDR color display standard and/or a HLG color display standard; alternatively, the target color display standard is the SDR color display standard, and the non-target color display standard includes the HLG color display standard and/or the PQ color display standard; alternatively, the target color display standard is the HLG color display standard, and the non-target color display standard includes the SDR color display standard and/or the PQ color display standard.

In some embodiments, the image processing apparatus 400 may also include: an editing processing module 405, which is configured to process the plurality of multimedia materials according to editing operation modes respectively corresponding to one or more editing types.

During the process of editing multimedia materials, the rendering module 403 can perform image rendering in real time according to processing results of the editing operation modes, and preview the editing effect on the display screen of the electronic device.

On the basis that the image processing apparatus provided in this embodiment can be used to execute any of the above method embodiments, its implementation principles and technical effects are similar. Reference may be made to the detailed description of the foregoing method embodiments, which, for the sake of simplicity, will not be described again here.

Exemplarily, the present disclosure also provides an electronic device.

Figure 5:
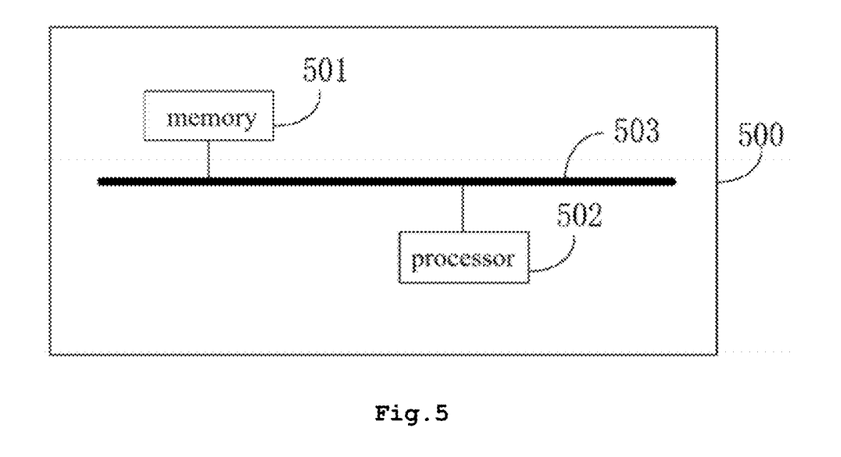
FIG. 5 is a schematic structural diagram of an electronic device provided in an embodiment of the present disclosure.

FIG. 5 is a schematic structural diagram of an electronic device provided in an embodiment of the present disclosure. Referring to FIG. 5, the electronic device 500 provided in this embodiment includes: a memory 501 and a processor 502.

The memory 501 may be an independent physical unit, and may be connected to the processor 502 by means of a bus 503. The memory 501 and the processor 502 can also be integrated together and implemented by means of hardware.

The memory 501 is used to store program instructions, and the processor 502 calls the program instructions to execute the technical solutions of any of the above method embodiments.

Optionally, when part or all of the methods in the above embodiments are implemented by means of software, the above electronic device 500 may also include only the processor 502. The memory 501 for storing programs is located outside the electronic device 500, and the processor 502 is connected to the memory through circuits/wires for reading and executing the programs stored in the memory.

The processor 502 may be a central processing unit (CPU), a network processor (NP), or a combination of CPU and NP.

The processor 502 may also include a hardware chip. The above hardware chip may be an application-specific integrated circuit (ASIC), a programmable logic device (PLD) or a combination thereof. The above PLD may be a complex programmable logic device (CPLD), a field-programmable gate array (FPGA), a general array logic (GAL) or any combination thereof.

The memory 501 may include a volatile memory, such as a random-access memory (RAM); the memory may also include a non-volatile memory, such as a flash memory (flash memory), a hard disk drive (HDD) or a solid-state drive (SSD); the memory may also include a combination of the above types of memories.

The present disclosure also provides a readable storage medium, including computer program instructions;
the computer program instructions, when executed by at least one processor of an electronic device, implementing the image processing method shown in any of the above method embodiments.

The present disclosure also provides a computer program product which, when executed by a computer, allows the computer to implement the image processing method shown in any of the above method embodiments.

The present disclosure also provides a computer program, including instructions which, when executed by a processor, allow the processor to implement the image processing method shown in any of the above method embodiments.

It should be noted that in this article, relational terms such as "first" and "second" are only used to distinguish one entity or operation from another entity or operation, and do not necessarily require or imply the existence of any such actual relationship or order between these entities or operations. Furthermore, the terms "includes", "contains" or any other variation thereof are intended to cover a non-exclusive inclusion such that a process, method, article or device that includes a set of elements includes not only those elements, but also other elements not expressly listed, or which are inherent to such process, method, article or device. Without further limitation, an element defined by the statement "includes a . . . " does not exclude the presence of additional identical elements in a process, method, article, or device that includes the stated element.

The above descriptions are only specific embodiments of the present disclosure, enabling those skilled in the art to understand or implement the present disclosure. Various modifications to these embodiments will be readily apparent to those skilled in the art, and the generic principles defined herein may be practiced in other embodiments without departing from the spirit or scope of the present disclosure. Therefore, the present disclosure is not to be limited to the embodiments described herein but is to be accorded the widest scope consistent with the principles and novel features disclosed herein.

What is claimed is:

1. A method for editing a plurality of multimedia materials with different color display standards in a mixed manner, comprising:
    determining, according to a target color display standard, a multimedia material of a non-target color display standard that is included in the plurality of multimedia materials;
    transferring the multimedia material of the non-target color display standard into a multimedia material of the target color display standard; and
    performing image rendering on the plurality of multimedia materials according to the target color display standard, so as to display the plurality of multimedia materials on a display screen of an electronic device according to an image rendering result or export the plurality of multimedia materials into a video file in a specific format according to the image rendering result,
    wherein the transferring the multimedia material of the non-target color display standard into the multimedia material of the target color display standard comprises:
    in response to that the multimedia material of the non-target color display standard is generated according to a video frame image of another multimedia material of the non-target color display standard among the plurality of multimedia materials at a freeze frame position, transferring the multimedia material of the non-target color display standard into the multimedia material of the target color display standard.

2. The method according to claim 1, wherein before the determining, according to a target color display standard, a multimedia material of a non-target color display standard that is included in the plurality of multimedia materials, the method further comprises:
    determining the target color display standard.

3. The method according to claim 2, wherein the determining the target color display standard comprises:
    determining the target color display standard according to a color display standard with a widest color space among color display standards respectively corresponding to the plurality of multimedia materials.

4. The method according to claim 2, wherein the determining the target color display standard comprises:
    determining the target color display standard according to a pre-specified color display standard.

5. The method according to claim 1, wherein the transferring the multimedia material of the non-target color display standard into the multimedia material of the target color display standard further comprises:
    in response to that the multimedia material of the non-target color display standard is generated according to a video frame image of a multimedia material of the target color display standard among the plurality of multimedia materials at the freeze frame position, not transferring the multimedia material of the non-target color display standard.

6. The method according to claim 1, wherein the transferring the multimedia material of the non-target color display standard into the multimedia material of the target color display standard further comprises:
  decoding the multimedia material of the non-target color display standard to obtain a first set of color values of individual pixel points of the multimedia material under the non-target color display standard;
  transferring, based on an electro-optical transfer function corresponding to the non-target color display standard, individual color values in the first set of color values into optical signals under the non-target color display standard, so as to obtain a first set of optical signals;
  transferring, based on an optical-optical transfer function, individual optical signals in the first set of optical signals to obtain a second set of optical signals under the target color display standard; and
  transferring, based on an optical-electric transfer function corresponding to the target color display standard, the individual optical signals in the second set of optical signals into color values, so as to obtain a second set of color values of the multimedia material under the target color display standard.

7. The method according to claim 6, wherein in response to the transferring, based on an optical-optical transfer function, the individual optical signals in the first set of optical signals to obtain a second set of optical signals under the target color display standard, the method further comprises: performing gamut mapping to align color values under different color display standards.

8. The method according to claim 1, wherein the target color display standard is a perceptually quantized (PQ) color display standard, and the non-target color display standard comprises a standard dynamic range (SDR) color display standard and/or a hybrid log gamma curve (HLG) color display standard; or,
  the target color display standard is the SDR color display standard, and the non-target color display standard comprises the HLG, color display standard and/or the PQ color display standard; or,
  the target color display standard is the HLG color display standard, and the non-target color display standard comprises the SDR color display standard and/or the PQ color display standard.

9. The method according to claim 1, wherein before the performing image rendering on the plurality of multimedia materials according to the target color display standard, the method further comprises:
  processing the plurality of multimedia materials according to editing operation modes respectively corresponding to one or more editing types.

10. An electronic device, comprising a memory and a processor;
  the memory being configured to store computer program instructions;
  the processor being configured to execute the computer program instructions, so that the electronic device implements the following operations for editing a plurality of multimedia materials with different color display standards in a mixed manner;
  determining, according to a target color display standard, a multimedia material of a non-target color display standard that is included in the plurality of multimedia materials;
  transferring the multimedia material of the non-target color display standard into a multimedia material of the target color display standard; and
  performing image rendering on the plurality of multimedia materials according to the target color display standard, so as to display the plurality of multimedia materials on a display screen of an electronic device according to an image rendering result or export the plurality of multimedia materials into a video file in a specific format according to the image rendering result,
  wherein the transferring the multimedia material of the non-target color display standard into the multimedia material of the target color display standard comprises:
  in response to that the multimedia material of the non-target color display standard is generated according to a video frame image of another multimedia material of the non-target color display standard among the plurality of multimedia materials at a freeze frame position, transferring the multimedia material of the non-target color display standard into the multimedia material of the target color display standard.

11. The electronic device according to claim 10, wherein before the determining, according to a target color display standard, a multimedia material of a non-target color display standard that is included in the plurality of multimedia materials, the processor is further configured to execute the computer program instructions, so that the electronic device implements the following operation:
  determining the target color display standard.

12. The electronic device according to claim 11, wherein the determining the target color display standard comprises:
  determining the target color display standard according to a color display standard with a widest color space among color display standards respectively corresponding to the plurality of multimedia materials.

13. The electronic device according to claim 11, wherein the determining the target color display standard comprises:
  determining the target color display standard according to a pre-specified color display standard.

14. The electronic device according to claim 10, wherein the transferring the multimedia material of the non-target color display standard into the multimedia material of the target color display standard further comprises:
  in response to that the multimedia material of the non-target color display standard is generated according to a video frame image of a multimedia material of the target color display standard among the plurality of multimedia materials at the freeze frame position, not transferring the multimedia material of the non-target color display standard.

15. The electronic device according to claim 10, wherein the transferring the multimedia material of the non-target color display standard into the multimedia material of the target color display standard further comprises:
  decoding the multimedia material of the non-target color display standard to obtain a first set of color values of individual pixel points of the multimedia material under the non-target color display standard;
  transferring, based on an electro-optical transfer function corresponding to the non-target color display standard, individual color values in the first set of color values into optical signals under the non-target color display standard, so as to obtain a first set of optical signals;
  transferring, based on an optical-optical transfer function, individual optical signals in the first set of optical signals to obtain a second set of optical signals under the target color display standard; and
  transferring, based on an optical-electric transfer function corresponding to the target color display standard, the individual optical signals in the second set of optical signals into color values, so as to obtain a second set of color values of the multimedia material under the target color display standard.

16. A non-transitory computer readable storage medium, comprising computer program instructions;
the computer program instructions, when executed by at least one processor of an electronic device, causing the electronic device to implement the following operations for editing a plurality of multimedia materials with different color display standards in a mixed manner:
determining, according to a target color display standard, a multimedia material of a non-target color display standard that is included in the plurality of multimedia materials;
transferring the multimedia material of the non-target color display standard into a multimedia material of the target color display standard; and
performing image rendering on the plurality of multimedia materials according to the target color display standard, so as to display the plurality of multimedia materials on a display screen of an electronic device according to an image rendering result or export the plurality of multimedia materials into a video file in a specific format according to the image rendering result,
wherein the transferring the multimedia material of the non-target color display standard into the multimedia material of the target color display standard comprises:
in response to that the multimedia material of the non-target color display standard is generated according to a video frame image of another multimedia material of the non-target color display standard among the plurality of multimedia materials at a freeze frame position, transferring the multimedia material of the non-target color display standard into the multimedia material of the target color display standard.

17. The non-transitory computer readable storage medium according to claim 16, wherein before the determining, according to a target color display standard, a multimedia material of a non-target color display standard that is included in the plurality of multimedia materials, the computer program instructions, when executed by at least one processor of the electronic device, further causes the electronic device to implement the following operation:
determining the target color display standard.

18. The non-transitory computer readable storage medium according to claim 17, wherein the determining the target color display standard comprises:
determining the target color display standard according to a color display standard with a widest color space among color display standards respectively corresponding to the plurality of multimedia materials.

19. The non-transitory computer readable storage medium according to claim 17, wherein the determining the target color display standard comprises:
determining the target color display standard according to a pre-specified color display standard.

20. The non-transitory computer readable storage medium according to claim 16, wherein the transferring the multimedia material of the non-target color display standard into the multimedia material of the target color display standard further comprises:
in response to that the multimedia material of the non-target color display standard is generated according to a video frame image of a multimedia material of the target color display standard among the plurality of multimedia materials at the freeze frame position, not transferring the multimedia material of the non-target color display standard.

* * * * *